United States Patent [19]

Greaf et al.

[11] 4,006,898
[45] Feb. 8, 1977

[54] VIDEO GAME TARGET RESET APPARATUS

[75] Inventors: Clarence Greaf; William R. Price, both of Fort Wayne, Ind.

[73] Assignee: The Magnavox Company, Fort Wayne, Ind.

[22] Filed: Oct. 28, 1975

[21] Appl. No.: 626,166

[52] U.S. Cl. .............................. 273/85 R; 273/1 E; 273/DIG. 28

[51] Int. Cl.² .......................................... A63F 9/00

[58] Field of Search ............. 273/1 E, 85 R, 101.1, 273/DIG. 28; 35/10.2, 25; 178/6.8; 340/324 AD

[56]  References Cited
UNITED STATES PATENTS 2,957,695  10/1960  Arizpe ....................... 273/101.1 X
3,809,395  5/1974   Allison et al. ...................... 273/1 E
3,829,095  8/1974   Baer ............................... 273/101.1

Primary Examiner—Richard C. Pinkham
Assistant Examiner—Vance Y. Hum
Attorney, Agent, or Firm—Thomas A. Briody; William J. Streeter; George R. Pettit

[57]  ABSTRACT

Apparatus for returning the target to play in an electronic video game. Target return is initiated by detecting the coincidence of a player marker with a game boundary or another player marker. Separate reset switches are eliminated without depriving player participants of game control and protection against an inadvertent reset is provided.

9 Claims, 3 Drawing Figures

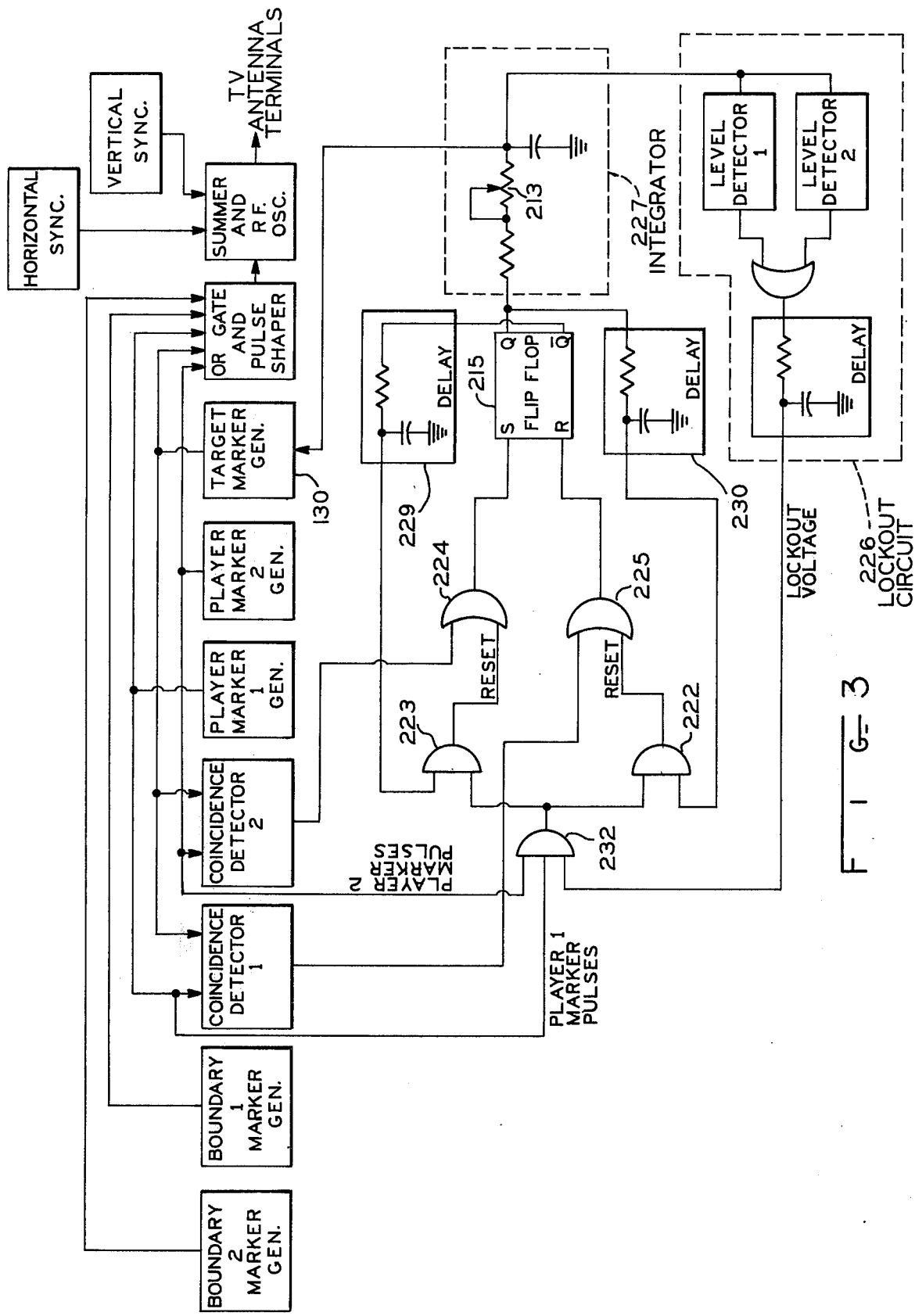

VIDEO GAME TARGET RESET APPARATUS

DESCRIPTION OF THE PRIOR ART

Video game apparatus which electronically simulate handball, tennis, hockey and other games are known in the art. In such game apparatus, the playing field is simulated on a cathode ray tube (CRT) raster display. Player positions, traveling game objects simulating a ball, puck, or target, boundaries and walls are simulated electronically and are displayed on the CRT. Controls are provided whereby game participants control the position of the player position markers. One such game apparatus is described more particularly in U.S. Pat. No. 3,659,284 issued Apr. 25, 1972 to William Rusch.

In one version of a video game apparatus, which simulates a hockey game, two participants position player markers so as to intercept a target marker (representing a puck) which moves back and forth across the CRT display. The player who makes contact with the puck may control the "English" or the vertical target position by means of a separate control. "English" control alternates between the respective players. A gap in each of the two vertical walls located on the right and left side of the display represents a goal. Each player attempts to intercept the target marker with his player marker and thereby direct the target marker into the wall gap which his opponent is defending. When a player marker intercepts a target marker, the target marker reverses direction and continues to travel until it is intercepted by a player marker or rebounds from the wall markers. When a player is successful in directing the simulated target into the opening in the simulated wall, a score is made and the target marker remains out of play until the target is reset.

In another video game which simulates a tennis game, a single boundary marker representing the net is shared in the center of the screen. Each player marker is positioned on opposite sides of the boundary marker. When the target marker moves horizontally across the CRT display, each player attempts to intercept the target marker with his position marker when it enters the playing area on his side of the boundary. When a player fails to intercept the target marker the target marker enters the out of bounds region. The player who misses the target must then enable the target reset to "re-serve" the target. The reset function has in one version of a video game been accomplished by activating a separate control provided to each participant of the video game. This has the disadvantages of added cost and the tendency to divert a player's attention away from the screen when he is initiating the reset. In another version of a video game, the reset is automatic and occurs at a preset time after the target has entered the out of bounds region. This system deprives the players of some measure of game control.

SUMMARY OF THE INVENTION

The present invention eliminates the need for separate reset controls by utilizing the positions of the player markers to initiate reset. This permits the players to keep their hands on the player marker position controls and their eyes on the game display.

One embodiment of the invention provides a target reset when a player who has failed to intercept a target marker moves his position marker into coincidence with a boundary marker.

Another embodiment of this invention provides a target reset when the players bring their position markers into coincidence.

Both embodiments of the invention provide a lockout circuit to prevent an inadvertent reset. The lockout prevents a reset until the target marker remains in the out of bounds region for a time sufficient to resolve doubts as to whether it was missed by the player.

It is an object of this invention to overcome the necessity of a separate player operable reset control.

It is a further object of this invention to allow the game control to remain substantially with the players during the reset operation.

Another object of the invention is to provide a lockout circuit to prevent an inadvertent reset of the system.

The attached drawing provides a schematic representation of apparatus for accomplishing the above objectives.

BRIEF DESCRIPTION OF THE DRAWINGS

FIG. 3 is a schematic representation of a circuit for generating a system reset when two player position markers are in coincidence.

DESCRIPTION OF THE PREFERRED EMBODIMENTS

Figure 1:
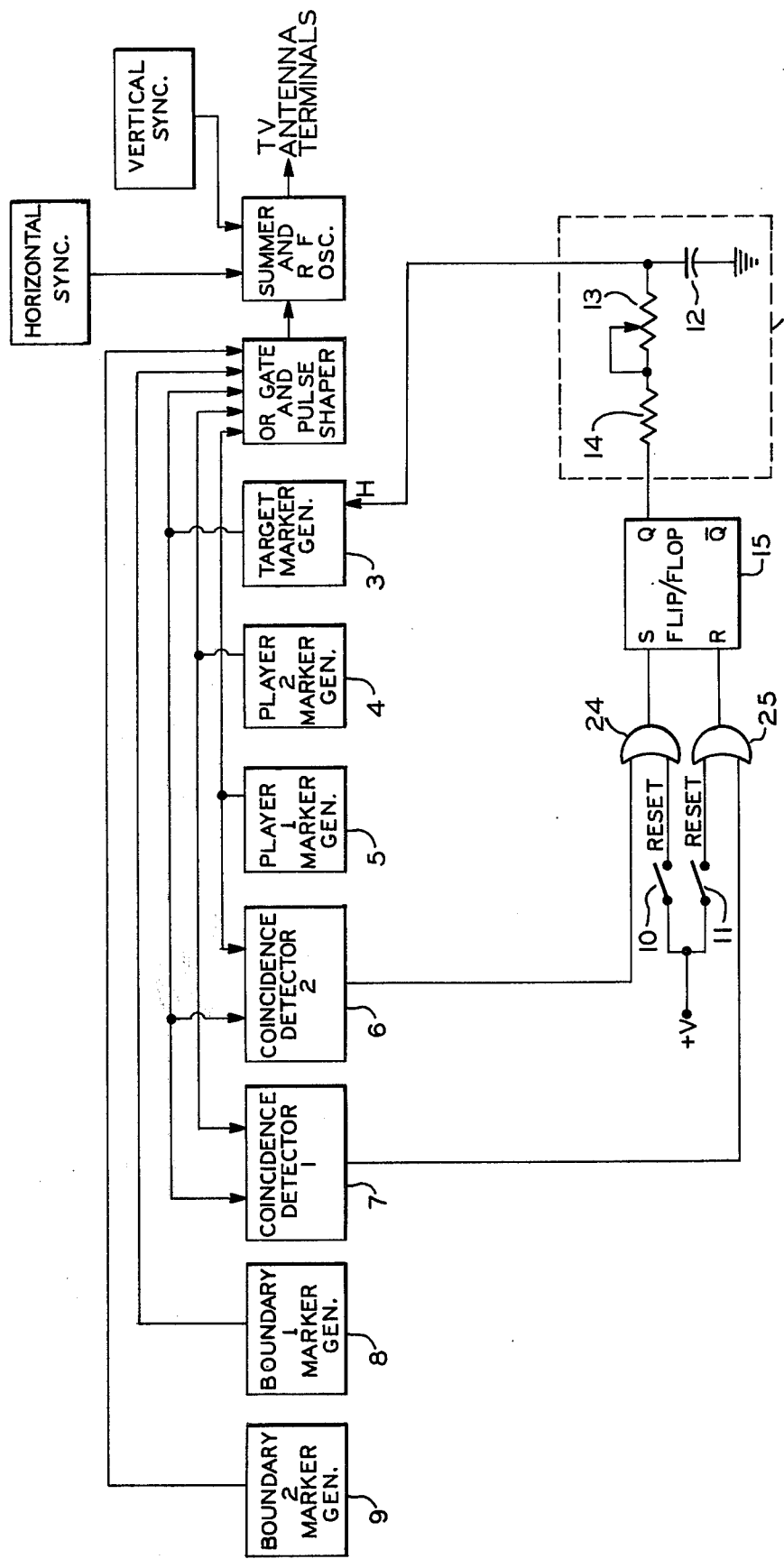
FIG. 1 is a partial block diagram of a circuit used to generate the game pulses of a video game.

Referring to FIG. 1, a partial block diagram illustrates portions of a prior art video game incorporating separate reset switches for initiating a target reset. Video pulses for displaying a target marker are generated by a spot generator 3. Other spot generators 4, 5, 8, 9 provide video pulses for displaying player markers and boundary markers. The details of the spot generator 3 are shown in the aforementioned Rusch patent. The spot generator 3 produces pulses that are time related to the system vertical and horizontal sync pulses. The CRT display determines the target marker location from the time relationship between the sync pulses and the video pulses. Target marker position is controlled by applying a d.c. voltage to the vertical and horizontal inputs of the spot generator 3. The horizontal position of the target marker is changed by changing the input voltage to the horizontal input of the spot generator 3. When this voltage decreases to $V_o$, the target marker is out of bounds on the extreme right side of the screen. When the voltage reaches a level of $V_1$, the target marker is out of bounds on the extreme left side of the screen.

The voltage used to control the horizontal position of the target marker is derived from the flip flop 15. The flip flop is the kind referred to in the art as an "R-S flip flop." When the Q output of the flip flop 15 is in the logic 1 state, a voltage corresponding to $V_1$ is presented to an integrator circuit 27 comprising a resistor 14, potentiometer 13, and capacitor 12; and capacitor 12 voltage increases towards $V_1$. The rate at which the capacitor voltage increases may be changed by changing the setting of potentiometer 13. Controlling the capacitor 12 charge rate will control the horizontal target velocity. When the flip flop 15 changes state and Q is at a voltage level of $V_o$, the target moves towards the right as the capacitor 12 discharges towards $V_o$. OR gates 24, 25 are used to provide signals to change the state of the flip flop 15 which effects a change in the direction of travel of the target marker. If the Q output of the flip flop 15 is in the logic 1 state, OR gate 25 will provide a signal to the Reset input of flip flop 15 for changing the state of the flip flop 15. If the Q output of the flip flop 15 is in the zero logic state, OR gate 24 provides an input to the Set input of the flip flop 15 for changing the state of the flip flop 15. When a player position marker successfully intercepts a target marker a coincidence detector 6, 7 provides a signal to the OR gates 24, 25 to change the state of the flip flop 15. When a player position marker fails to make an interception, the target marker moves to an out of bounds location. The player who failed to make an interception must then activate a reset switch 10, 11 which supplies a pulse to OR gate 24, 25. The flip flop 15 changes state and the target marker moves into the field of play.

Figure 2:
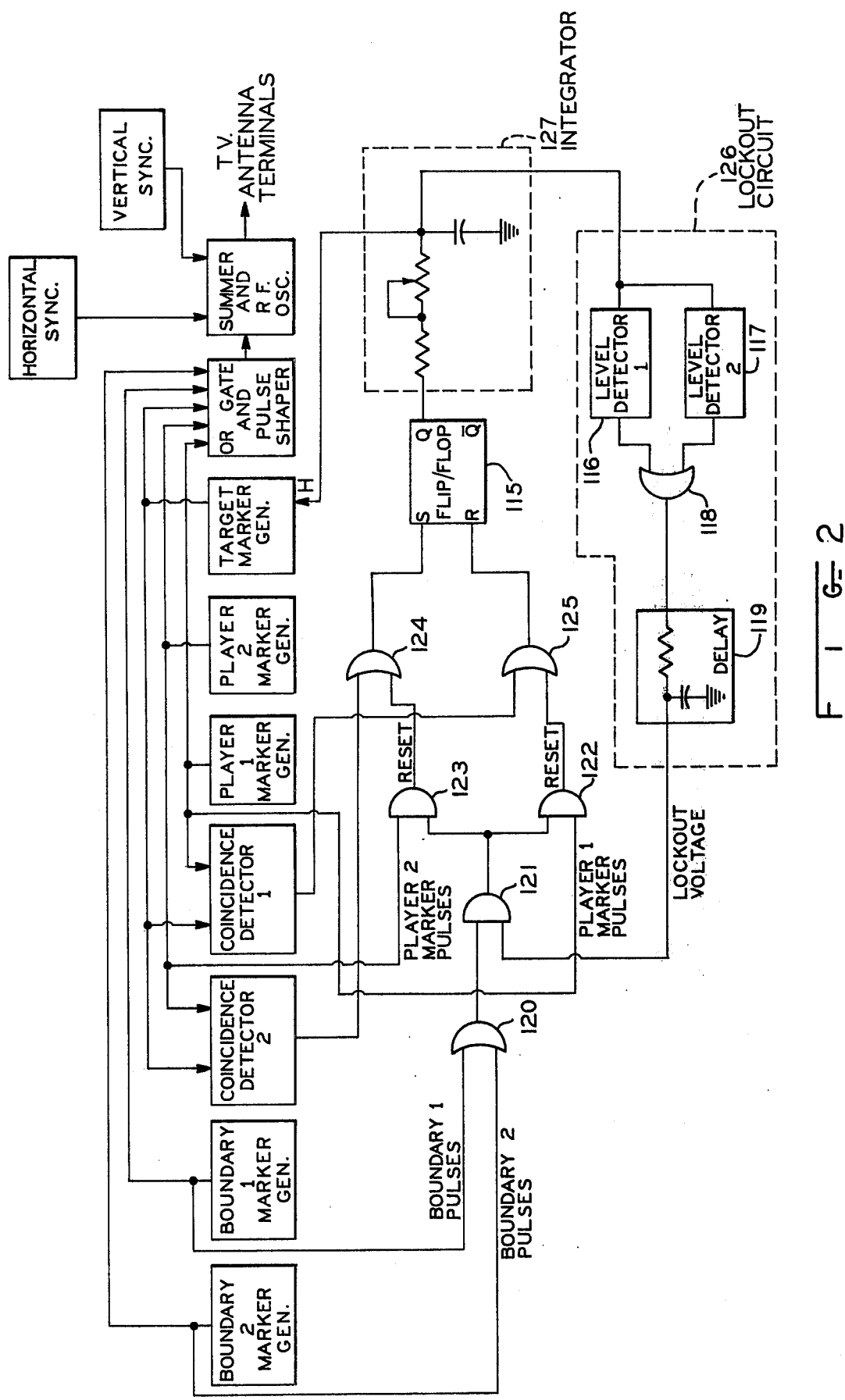
FIG. 2 is a schematic representation of a circuit for generating a system reset when a player moves his position marker into coincidence with a boundary.

Referring to FIG. 2, a circuit for initiating a target reset without a separate manually operable reset control for each player is shown connected to the video game. The flip flop 115 and integrator circuit 127 control the direction of travel and the horizontal velocity of the target marker as in the previous system of FIG. 1. To initiate a target reset, the player who failed to intercept the target moves his marker into coincidence with a boundary marker. This condition is detected by supplying game pulses representing the player position markers and the boundaries to two coincidence detectors. The coincidence detectors shown as AND gates 122, 123 provide a signal for changing the state of flip flop 115 thereby resetting the system. A lockout circuit 126 prevents a target reset until the target marker has entered the out of bounds area and remains there for a predetermined time. This prevents the players from resetting when the target marker is in play.

The lockout circuit comprises two level detectors 116, 117, an OR gate 118, and a delay circuit 119. The two level detectors 116, 117 detect a target horizontal position voltage of $V_1$ or $V_o$. When either of these conditions exist, indicating an out of bounds target position, a voltage is presented to the delay circuit 119 through the OR gate 118. After a predetermined delay, an enabling signal appears at the output of the delay circuit 119. The delay circuit prevents the target from being reset when a player is attempting to intercept the target marker near a boundary marker. This resolves any doubts as to whether the target was reset or whether the player actually made an interception.

OR gate 120 supplies pulses representing boundary positions to an input of AND gate 121. The signal from the delay circuit 119 enables a switching means shown as AND gate 121 to pass pulses representing boundary positions to one input of the two coincidence detectors shown as AND gates 122 and 123. Pulse trains representing the player position markers enter the remaining inputs of the AND gates 122, 123. When pulses representing a player position marker are time coincident with pulses representing a boundary marker, one of the AND gates 122 or 123 will provide the reset signal that the switches 10, 11 of the system of FIG. 1 provided. OR gates 124, 125 apply the reset pulse to the proper input of the flip flop 115. The flip flop 115 changes state and the target marker moves from the out of bounds region to the area of play.

Referring to FIG. 3, another embodiment of a target reset is shown connected to the video game. Target reset occurs when the players bring their position markers into coincidence. A lockout circuit 226 is provided as in the previous system of FIG. 2 to prevent a reset while the target marker is in the field of play.

Horizontal target position is established as in the systems of FIGS. 1 and 2 by a d.c. voltage supplied to the target marker generator 130 from an integrator 227. Varying the time constant of the integrator 227 with potentiometer 213 changes the target marker horizontal velocity. The flip flop 215 controls the direction of travel of the target marker. Or gates 224, 225 provide target reset pulses and pulses indicating a target marker interception for changing the state of flip flop 215.

The $\overline{Q}$ and Q outputs of the flip flop 215 are returned through delay circuits 229 and 230 respectively to the inputs of two AND gates 222 and 223. The remaining inputs of AND gates 222 and 223 are connected together and to the output of AND gate 232. Since either the Q or $\overline{Q}$ output of flip flop 215 is at a logic 1 level, applying an enabling signal to the common inputs of the AND gates 222, 223 will enable one of these AND gates 222, 223. These AND gates 222, 223 are coupled through the OR gates 224, 225 to the flip flop 215 inputs and supply the target reset pulse when the reset conditions are met.

AND gate 232 serves as a coincidence detector and produces an output when pulses representing the two player position markers are time coincident with each other and a signal generated by the lockout circuit 226. The output of AND gate 232 applied to the common inputs of the AND gates 222, 223 causes the flip flop 215 to change state. This change of state moves the target into the field of play.

The examples given in this specification illustrate two examples of using known game markers to provide a target reset. Those who are skilled in the art will recognize other possible combinations of game makers for generating a target reset. The apparatus in this specification may be readily modified by those skilled in the art to perform the reset function using other combinations of game markers.

What is claimed is:

1. In an electronic video game having means for generating a signal representing a target marker, means for generating a plurality of signals representing a plurality of game player position markers including 1st and 2nd game player position markers, means for generating a signal representing a boundary marker, and a flip flop for changing the direction of travel of said target marker, an improved target marker reset comprising:
   a. coincident detection circuit means for receiving said signal for representing a boundary marker and said plurality of signals representing a plurality of game player position markers, said coincident detection circuit means having an output signal when a player position marker is coincident with a boundary;
   b. lockout circuit means connected to said flip flop output terminal for providing a signal when a target marker is in an out of bounds region; and
   c. means for changing the state of said flip flop, said means being operatively connected to said lockout circuit means and said coincident detection circuit means whereby the state of said flip flop will change when said coincident detection circuit output signal occurs simultaneously with said lockout circuit means output signal.

2. The apparatus of claim 1 wherein said lockout means comprises:
   a. a first voltage detector for receiving the output voltage of said flip flop, said voltage detector having an output signal when said target marker is in a first out of bounds region;
   b. a second voltage detector for receiving the output voltage of said flip flop, said voltage detector having an output signal when said target marker is in a second out of bounds region; and
   c. an OR gate for receiving said voltage detector output signals.

3. The apparatus of claim 1 further comprising means for delaying said lockout means signal for a predetermined time.

4. In an electronic video game having means for generating a signal representing a target marker, means for generating a plurality of signals representing a plurality of player position markers including first and second game player position markers, and a flip flop for changing the direction of travel of said target marker, an improved reset apparatus comprising:
   a. coincident detection means for receiving said plurality of signals representing a plurality of player position markers, said detection means having an output signal when two player position markers are in coincidence; and
   b. means for changing the state of said flip flop in response to said coincident detection means output signal.

5. The apparatus of claim 4 further comprising:
   a. lockout means for providing a signal when a target marker is in an out of bounds region; and
   b. means for preventing said flip flop from changing state until said lockout means produces a signal.

6. The apparatus of claim 5 further comprising means for delaying said lockout means signal for a predetermined time.

7. The apparatus of claim 5 wherein said lockout means comprises:
   a. a first voltage detector for receiving the output voltage of said flip flop, said voltage detector having an output signal when said target marker is in a first out of bounds region;
   b. a second voltage detector for receiving the output voltage of said flip flop, said voltage detector having an output signal when said target marker is in a second out of bounds region; and
   c. an OR gate for receiving said output signals.

8. In an electronic video game of the type wherein target direction of travel is controlled by the state of a flip flop, an improved reset circuit for producing a change in the state of said flip flop comprising:
   a. a source of pulses indicating the position of a first player marker;
   b. a source of pulses for indicating the position of a second player marker;
   c. a source of pulses for indicating the position of boundary markers;
   d. coincident detection means operatively connected to said sources of pulses whereby an output signal is supplied when a player marker is coincident with a boundary marker; and
   e. means for changing the state of said flip flop, said means being responsive to a signal from said coincident detection means.

9. In an electronic video game of the type wherein target direction of travel is controlled by the state of a flip flop, an improved reset circuit for producing a change in the state of said flip flop wherein said improvement comprises:
   a. a first source of pulses indicating a first game marker position;
   b. a second source of pulses indicating a second game marker position;
   c. a first circuit means coupled to said first source and said second source of pulses, said circuit means having an output signal when said first and second game markers are coincident;
   d. lockout means for producing an output signal when said target is out of play; and
   e. means for changing the state of said flip flop when said lockout means output signal and said first circuit means output signal occur simultaneously.

* * * * *